(12) United States Patent
Liu et al.

(10) Patent No.: US 9,021,530 B2
(45) Date of Patent: Apr. 28, 2015

(54) METHOD AND SYSTEM FOR PLAYING BACKGROUND MUSIC AND KEY TONE BASED ON EMBEDDED BROWSER

(75) Inventors: Hanjun Liu, Guangdong (CN); Rui Yi, Guangdong (CN)

(73) Assignee: Shenzhen Coship Electronics Co., Ltd., Shenzhen, Guangdong (CN)

( * ) Notice: Subject to any disclaimer, the term of this patent is extended or adjusted under 35 U.S.C. 154(b) by 409 days.

(21) Appl. No.: 13/142,411

(22) PCT Filed: Jan. 14, 2010

(86) PCT No.: PCT/CN2010/070170
§ 371 (c)(1),
(2), (4) Date: Jun. 27, 2011

(87) PCT Pub. No.: WO2010/081415
PCT Pub. Date: Jul. 22, 2010

(65) Prior Publication Data
US 2011/0277007 A1 Nov. 10, 2011

(30) Foreign Application Priority Data
Jan. 19, 2009 (CN) .......................... 2009 1 0105209

(51) Int. Cl.
*H04N 5/445* (2011.01)
*H04H 60/33* (2008.01)
*H04N 21/81* (2011.01)
*H04N 21/43* (2011.01)
*H04N 21/434* (2011.01)
*H04N 21/4782* (2011.01)
*H04L 29/06* (2006.01)

(52) U.S. Cl.
CPC ....... *H04N 21/8113* (2013.01); *H04N 21/4307* (2013.01); *H04N 21/4345* (2013.01); *H04N 21/4782* (2013.01); *H04L 65/4015* (2013.01); *H04L 65/604* (2013.01); *H04L 65/608* (2013.01)

(58) Field of Classification Search
USPC .................................................. 725/51, 136
See application file for complete search history.

(56) References Cited

U.S. PATENT DOCUMENTS

| | | | |
|---|---|---|---|
| 6,543,052 B1 * | 4/2003 | Ogasawara | ..................... 725/60 |
| 2003/0005429 A1 | 1/2003 | Colsey | |
| 2003/0148734 A1 * | 8/2003 | Kim | ............................... 455/66 |
| 2005/0071253 A1 * | 3/2005 | Yang | ............................... 705/27 |
| 2010/0082771 A1 * | 4/2010 | Wood et al. | ................... 709/219 |

FOREIGN PATENT DOCUMENTS

| | | |
|---|---|---|
| CN | 101184208 A | 5/2008 |
| CN | 101193267 A | 6/2008 |
| CN | 101489068 A | 7/2009 |

\* cited by examiner

*Primary Examiner* — Nasser Goodarzi
*Assistant Examiner* — Michael Hong
(74) *Attorney, Agent, or Firm* — Tim Tingkang Xia, Esq.; Morris, Manning & Martin, LLP

(57) ABSTRACT

A method and system for playing background music and key tone based on an embedded browser, and a digital television receiving terminal. The method comprises: analyzing and downloading web data, intercepting protocol registration events, and sending a background music start command when the background music need to be played; analyzing transport stream (TS) data pushed by a server, obtaining data required for playing the background music, and playing the background music; and receiving a key operation command from a user, analyzing the TS data pushed by the server when playing the background music, obtaining data required for playing key tone, and playing the key tone instructed in the key operation command. With the preceding method, system and digital television receiving terminal, defects in concurrently playing multi-channel audio data are overcome and the background music and key tone can be played concurrently.

12 Claims, 2 Drawing Sheets

METHOD AND SYSTEM FOR PLAYING BACKGROUND MUSIC AND KEY TONE BASED ON EMBEDDED BROWSER

CROSS-REFERENCE TO RELATED PATENT APPLICATIONS

This application claims priority of Chinese Patent Application No. 200910105209.3, filed Jan. 19, 2009, entitled "METHOD AND SYSTEM FOR PLAYING BACKGROUND MUSIC AND KEY TONE BASED ON EMBEDDED BROWSER", the disclosure of which are incorporated by reference herein in its entireties.

FIELD OF THE INVENTION

The present invention relates to digital television technologies, and in particular, to a method and system for playing background music and key tone based on an embedded browser, and a digital television receiving terminal.

BACKGROUND OF THE INVENTION

With the constant development of the digital television technologies, the Internet Protocol Television (IPTV) technology is increasingly mature. With this technology, users can watch digital television programs and browse web pages using a set top box (STB). When watching television programs, users can browse the program guide using a remote controller. Except the focus de-selection mode to prompt key switching, no other operations to prompt key switching are available. To satisfy the multi-functionality demand on the STB, the digital television, IPTV, and even mobile phone platform all require the support from an embedded browser.

With the key tone for prompting the key operations provided by the embedded browser, the defect that no tone is played for browsing web pages is overcome. In addition, with the implementation of background music playing using the embedded browser, the issue that beautiful background music cannot be enjoyed by users is also addressed. However, the current key tone and key switching operation are based on single thread.

The background music are played by establishing a connection control channel with the player system. A background music playing request is sent to the player system. Upon receiving the request, the player system selects to establish a media transfer channel to play the transferred data or deny the request according to its status (whether the player system is idle or not). This satisfies the users' demands on the background music.

Accordingly, the background music and key tone are played in two independent threads. The system cannot play the background music and responds to the user keys when users are browsing the program guide. In addition, the operation effects on the screen are not blocked.

Therefore, a heretofore unaddressed need exists in the art to address the aforementioned deficiencies and inadequacies.

SUMMARY OF THE INVENTION

In one aspect, the present invention provides a method and system for playing background music and key tone based on an embedded browser to address the issue in the prior art that the background music and key tone cannot be played concurrently.

In one embodiment, the present invention provides a method for playing background music and key tone based on an embedded browser. The method comprises:

analyzing and downloading web data, intercepting protocol registration events, and sending a background music start command when determining that the background music need to be played;

analyzing transport stream (TS) data pushed by a server, obtaining data required for playing the background music, and playing the background music; and receiving a key operation command from a user, analyzing the TS data pushed by the server when playing the background music, obtaining data required for playing key tone, and playing the key tone instructed in the key operation command.

In another embodiment, the present invention provides a digital television receiving terminal. The terminal comprises: an embedded browser module, a background music playing module, and an event managing module.

The embedded browser module is configured to analyze and download web data, intercept protocol registration events, and issue a background music start command when determining that background music need to be played.

The event managing module is configured to send a key operation command received from a user to the embedded browser module and the background music playing module.

The background music playing module is configured to: upon receiving a background music start command, analyze TS data pushed by a server, obtain data required for playing the background music, and play the background music; upon receiving the key operation command from the user sent by the event managing module, analyze the TS data pushed by the server, obtain the data required for playing key tone, and play the key tone instructed in the key operation command from the user when playing the background music.

In a further embodiment, the present invention provides a system for playing background music and key tone based on an embedded browser. The system comprises a digital television receiving terminal and a server.

The digital television receiving terminal is configured to: analyze and download web data, intercept protocol registration events, and when determining that the background music need to be played, analyze TS data pushed by the server, obtain data required for playing background music, and playing the background music; upon receiving the key operation command from the user sent from the event managing module, analyze the TS data pushed by the server, obtain data required for playing the key tone, and play the key tone instructed in the key operation command when playing the background music.

The server is configured to push the TS to the digital television receiving terminal.

According to embodiments of the present invention, the web data is analyzed and downloaded, when the protocol registration events are intercepted, a background music start command is issued to the server, the data required for playing the background music are obtained according to the TS data pushed by the server, and the background music are played; meanwhile, the key operation command is received from the user, the data required for playing the key tone is obtained and the key tone are played when the background music are being played. Accordingly, defects in concurrently playing multi-channel audio data are overcome and the background music and key tone can be played concurrently.

These and other aspects of the present invention will become apparent from the following description of the preferred embodiment taken in conjunction with the following

DETAILED DESCRIPTION OF THE INVENTION

Figure 1:
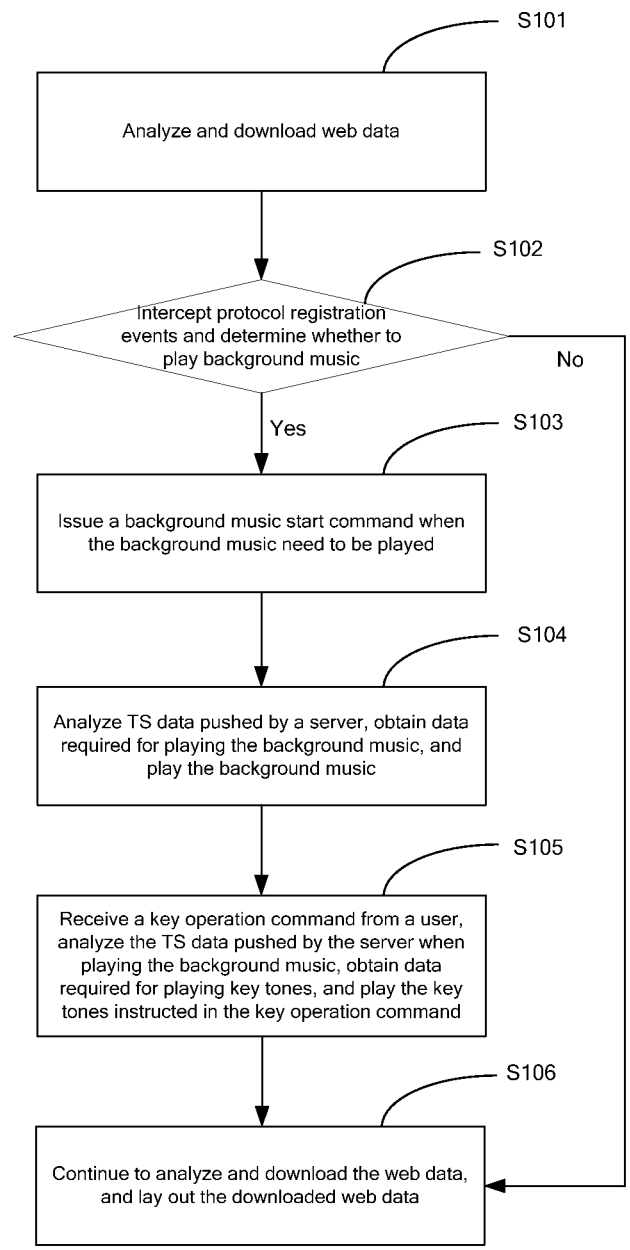
FIG. 1 is a flow chart of a method for playing background music and key tone based on an embedded browser according to one embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

According to embodiments of the present invention, the web data is analyzed and downloaded, when the protocol registration events are intercepted, a background music start command is issued to the server, the data required for playing the background music are obtained according to the TS data pushed by the server, and the background music are played; meanwhile, the key operation command is received from the user, the data required for playing the key tone is obtained and the key tone are played when the background music are being played.

FIG. 1 illustrates the implementation process of a method for playing background music and key tone based on an embedded browser according to one embodiment of the present invention. The method comprises specific steps as follows.

Step S101: An embedded browser analyzes and downloads web data.

Step S102: Protocol registration events are intercepted. Whether to play the background music is determined. If the background music need to be played, step S103 is performed; otherwise, step S106 is performed.

In embodiments of the present invention, the interception process is the process of determining whether to play the background music.

Step S103: A background music start command is issued when the background music need to be played.

Step S104: The TS data pushed by a server is analyzed, data required for playing the background music is obtained, and the background music are played.

Step S105: A key operation command is received from a user, the TS data pushed by the server is analyzed when the background music are being played, data required for playing key tone is obtained, and the key tone instructed in the key operation command are played.

Step S106: The embedded browser continues to analyze and download the web data, and lays out the downloaded web data.

In embodiments of the present invention, when receiving the key operation command from the user, the embedded browser performs focus switching according to the key information input by the user, and displays the laid-out data on the screen.

In embodiments of the present invention, before step S101 is performed, the actions for protocol registration events are performed. The protocol is the Real Time Streaming Protocol (RTSP).

According to embodiments of the present invention, the obtaining data of the background music and key tone may be specifically as follows: obtaining program specific information (PSI) from the TS data, obtaining a program identifier (PID) according to the PSI, and finding a program map table (PMT) according to the PID. The PMT comprises related information about the background music and key tone.

The PSI uses four tables to define the structure of the code stream: program association table (PAT), PMT, network information table (NIT), and conditional access table (CAT). The PAT specifies the PID forming the PMT of each program service in the TS. The corresponding PMT package being applied may be found according to the PID. The PMT provides a mapping between the program numbers and their original data streams. The mapping table is a set comprising all program definitions in a TS.

According to embodiments of the present invention, when the TS data pushed by the server is being analyzed and the protocol registration events are being intercepted, the background music playing function is enabled and the TS data is downloaded and analyzed continuously. When the key operation command is received from a user, the data required for playing the key tone is obtained from the TS data, the key tone are played. This implements the concurrent playing of the background music and key tone, without mutual interference.

Figure 2:
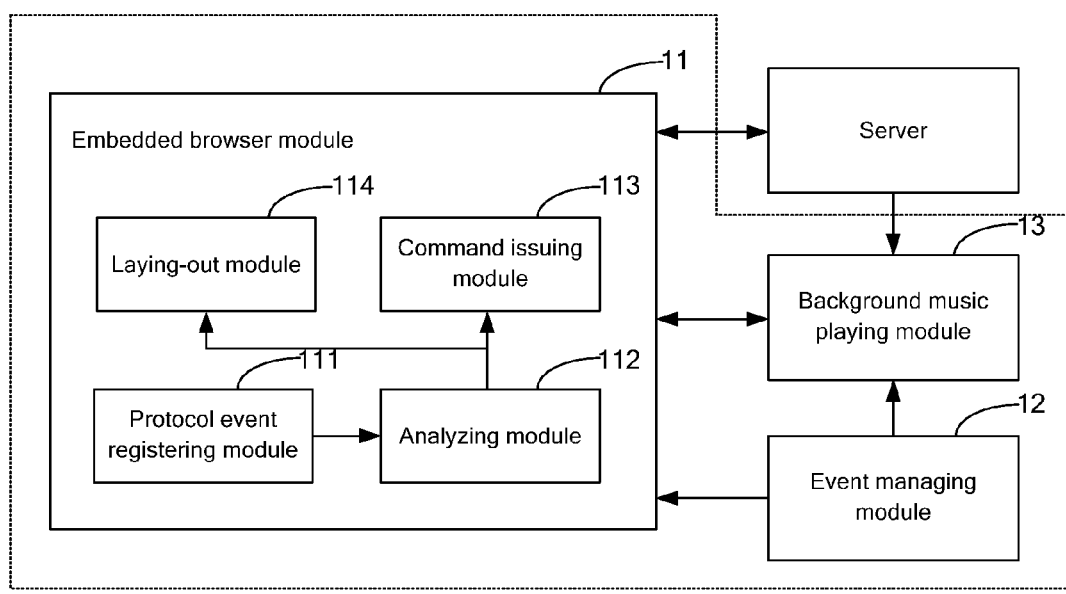
FIG. 2 is a schematic structure view of a system for playing background music and key tone based on an embedded browser according to one embodiment of the present invention.

FIG. 2 illustrates the structure of a system for playing background music and key tone based on an embedded browser according to one embodiment of the present invention. For ease of description, parts or components related to embodiments the present invention are only cited.

According to embodiments of the present invention, the system for playing background music and key tone based on an embedded browser comprises a digital television receiving terminal and a server. The digital television receiving terminal analyzes and downloads the web data, intercepts the protocol registration events, analyzes the TS data pushed by the server, obtains the data required for playing the background music, and plays the background music when determining that the background music need to be played; and analyzes the TS data pushed by the server, obtains the data required for playing the key tone, and plays the key tone instructed in the key operation command received from the user when playing the background music. The server pushes the TS to the digital television receiving terminal.

According to embodiments of the present invention, the digital television receiving terminal comprises an embedded browser module 11, an event managing module 12, and a background music playing module 13. The embedded browser module 11 analyzes and downloads web data, intercepts protocol registration events, and issues a background music start command to the background music playing module 13 when determining that background music need to be played. The event managing module 12 sends a key operation command received from a user to the embedded browser module 11 and the background music playing module 13. The background music playing module 13, upon receiving a background music start command from the embedded browser module 11, analyzes transport stream (TS) data pushed by a server, obtains data required for playing the background music, and plays the background music; upon receiving the key operation command from the user sent by the event managing module 12, the background music playing module 13 plays the key tone instructed in the key operation command from the user when playing the background music.

It should be noted that in the system provided in embodiments of the present invention, the embedded browser module 11 in the digital television receiving terminal may further comprise: an analyzing module 112 and a command issuing module 113.

The analyzing module 112 analyzes and downloads web data. The command issuing module 113 issues a background music start command to the background music playing module 13 when intercepting protocol registration events and determining that the background music need to be played.

In addition, the embedded browser module 11 according to embodiments of the present invention may further comprise a protocol event registering module 111 configured to perform actions for the protocol registration events. The protocol is the RTSP.

Further, the embedded browser module 11 may further comprise a laying-out module 114 configured to continue analyzing the downloaded web data and lay out the downloaded data.

According to embodiments of the present invention, the background music playing module 13 obtains PSI from the TS data, obtains a PID according to the PSI, and finds a PMT according to the PID. The PMT comprises related information about the background music and key tone.

According to embodiments of the present invention, the web data is analyzed and downloaded, when the protocol registration events are intercepted, the background music start command is issued to the server, the data required for playing the background music are obtained according to the TS data pushed by the server, and the background music are played; meanwhile, the key operation command is received from the user, the data required for playing the key tone is obtained and the key tone are played when the background music are being played. Accordingly, defects in concurrently playing multi-channel audio data and congestion in tone playing are overcome and the background music and key tone can be played concurrently.

It should be noted that the above are merely exemplary embodiments of the present invention. The scope of the present invention is not limited thereto. Variations or replacements readily apparent to persons skilled in the prior art within the technical scope of the present invention should fall within the scope of the present invention.

The invention claimed is:

1. A method for playing background music and key tone based on embedded browser in a digital television, comprising:
   (a) receiving a key operation command from a remote controller by a browser module of the embedded browser, analyzing and downloading web data, intercepting protocol registration events, and sending a background music start command to a background music playing module of the embedded browser when the background music need to be played;
   (b) analyzing transport stream (TS) data pushed by a server, obtaining data required for playing the background music, and playing the background music by the background music playing module in the digital television; and
   (c) receiving the key operation command by the background music playing module from the remote controller, analyzing the TS data pushed by the server, obtaining data required for playing key tone from the server, and playing the key tone instructed in the key operation command by the background music playing module when playing the background music.

2. The method according to claim 1, wherein before step A, the method further comprises:
   performing actions for the protocol registration events, the protocol being a Real Time Streaming Protocol (RTSP).

3. The method according to claim 1, wherein after step B and before step C, the method further comprises:
   continuing to analyze and download the web data and laying out the downloaded web data.

4. The method according to claim 1, wherein the background music or key tone are obtained by:
   obtaining program specific information (PSI) from the TS data, obtaining a program identifier (PID) according to the PSI, and finding a program map table (PMT) according to the PID; the PMT comprising related information about the background music and key tone.

5. A digital television receiving terminal, comprising: an embedded browser module, a background music playing module, and an event managing module, wherein:
   the event managing module is configured to send a key operation command received from a remote controller to the embedded browser module and the background music playing module;
   the embedded browser module is configured to receive the key operation command, and in response, analyze and download web data, intercept protocol registration events, and issue a background music start command when background music need to be played;
   and
   the background music playing module is configured to: upon receiving a background music start command, analyze transport stream (TS) data pushed by a server, obtain data required for playing the background music, and play the background music; upon receiving the key operation command from the remote controller sent by the event managing module, analyze the TS data pushed by the server, obtain the data required for playing key tone from the server, and play the key tone instructed in the key operation command from the remote controller when playing the background music.

6. The terminal according to claim 5, wherein the embedded browser module comprises:
   an analyzing module, configured to analyze and download the web data, and
   a command issuing module, configured to issue the background music start command upon determining that the background music need to be played when intercepting the protocol registration events.

7. A system for playing background music and key tone based on an embedded browser, comprising the digital television receiving terminal according to claim 5 and a server, wherein
   the digital television receiving terminal is configured to:
      when determining that the background music need to be played, analyze and download web data, intercept protocol registration events, and analyze transport stream (TS) data pushed by the server, obtain data required for playing background music, and playing the background music;
   upon receiving the key operation command from the remote controller sent from the event managing module, analyze the TS data pushed by the server, obtain data required for playing the key tone from the server, and play the key tone instructed in the key operation command when playing the background music; and the server is configured to push the TS to the digital television receiving terminal.

8. The terminal according to claim 6, wherein the embedded browser module further comprises a protocol event registering module configured to perform actions for the protocol registration events, the protocol being Real Time Streaming Protocol (RTSP).

9. The terminal according to claim 6, wherein the embedded browser module further comprises a laying-out module configured to continue analyzing the downloaded web data and lay out the downloaded data.

10. A system for playing background music and key tone based on an embedded browser, comprising the digital television receiving terminal according to claim 6 and a server, wherein
- the digital television receiving terminal is configured to: when determining that the background music need to be played, analyze and download web data, intercept protocol registration events, and analyze transport stream (TS) data pushed by the server, obtain data required for playing background music, and playing the background music; upon receiving the key operation command from the remote controller sent from the event managing module, analyze the TS data pushed by the server, obtain data required for playing the key tone from the server, and play the key tone instructed in the key operation command when playing the background music; and
- the server is configured to push the TS to the digital television receiving terminal.

11. A system for playing background music and key tone based on an embedded browser, comprising the digital television receiving terminal according to claim 8 and a server, wherein
- the digital television receiving terminal is configured to: when determining that the background music need to be played, analyze and download web data, intercept protocol registration events, and analyze transport stream (TS) data pushed by the server, obtain data required for playing background music, and playing the background music; upon receiving the key operation command from the remote controller sent from the event managing module, analyze the TS data pushed by the server, obtain data required for playing the key tone from the server, and play the key tone instructed in the key operation command when playing the background music; and
- the server is configured to push the TS to the digital television receiving terminal.

12. A system for playing background music and key tone based on an embedded browser, comprising the digital television receiving terminal according to claim 9 and a server, wherein
- the digital television receiving terminal is configured to: when determining that the background music need to be played, analyze and download web data, intercept protocol registration events, and analyze transport stream (TS) data pushed by the server, obtain data required for playing background music, and playing the background music; upon receiving the key operation command from the remote controller sent from the event managing module, analyze the TS data pushed by the server, obtain data required for playing the key tone from the server, and play the key tone instructed in the key operation command when playing the background music; and
- the server is configured to push the TS to the digital television receiving terminal.

* * * * *